US012701017B2

(12) United States Patent
Islam et al.

(10) Patent No.: US 12,701,017 B2
(45) Date of Patent: Aug. 4, 2026

(54) AUTHENTICATION WITH CLOUD-BASED SECURE ENCLAVE

(71) Applicant: Dashlane SAS, Paris (FR)

(72) Inventors: Mohammed Ruhul Islam, Taverny (FR); Ludovic Widmer, Clichy (FR); Guillaume Maron, Paris (FR); Cyril Leclerc, Paris (FR); Corentin Mors, Lyons (FR); Frédéric Rivain, Brooklyn, NY (US)

(73) Assignee: Dashlane SAS, Paris (FR)

( * ) Notice: Subject to any disclaimer, the term of this patent is extended or adjusted under 35 U.S.C. 154(b) by 217 days.

(21) Appl. No.: 18/417,228

(22) Filed: Jan. 19, 2024

(65) Prior Publication Data

US 2024/0283664 A1 Aug. 22, 2024

Related U.S. Application Data

(60) Provisional application No. 63/482,710, filed on Feb. 1, 2023.

(51) Int. Cl.
*H04L 9/32* (2006.01)
*H04L 9/30* (2006.01)

(52) U.S. Cl.
CPC .......... *H04L 9/3271* (2013.01); *H04L 9/3073* (2013.01)

(58) Field of Classification Search
CPC ... H04L 9/3271; H04L 9/3073; H04L 9/0825; H04L 9/0897; H04L 9/0822; H04L 9/3247

See application file for complete search history.

(56) References Cited

U.S. PATENT DOCUMENTS

| | | | | |
|---|---|---|---|---|
| 2015/0180869 A1* | 6/2015 | Verma | ................. | H04L 63/0861 |
| | | | | 726/4 |
| 2018/0137299 A1* | 5/2018 | Porter | ................. | G06F 21/6245 |
| 2018/0191695 A1* | 7/2018 | Lindemann | ......... | H04L 63/0853 |
| 2019/0243963 A1* | 8/2019 | Soriente | ................ | H04L 9/3247 |
| 2020/0092263 A1* | 3/2020 | Rohera | ................ | H04L 9/0869 |
| 2020/0127858 A1* | 4/2020 | Stöhr | ................. | H04L 63/0853 |
| 2020/0145219 A1* | 5/2020 | Sebastian | ................. | H04L 9/50 |

(Continued)

OTHER PUBLICATIONS

Hodges et al. "Web Authentication: An API for accessing Public Key Credentials Level 2" Apr. 8, 2021, pp. 1-175, retrieved at https://www.w3.org/TR/webauthn/.

(Continued)

*Primary Examiner* — Techane Gergiso

(57) ABSTRACT

Examples of the present disclosure provide an authenticator system that protects secret authentication keys associated with relying parties to which a user is authenticating. Present systems and methods allow cross-platform and cross-device WebAuthn usage. Example systems employ a server-based secure enclave and secure tunnel communication between the browser application or mobile application and the secure enclave server. A user of a service provider of the authenticator system owns the secret authentication key, which is stored in an encrypted vault protected by a user secret and hosted by the service provider. Decrypting the secret key may be based on a key arrangement, where keys from the user, the service provider, and the secure enclave are used to successfully decrypt the secret authentication key within the secure enclave.

18 Claims, 10 Drawing Sheets

(56)          References Cited

U.S. PATENT DOCUMENTS

| | | | | |
|---|---|---|---|---|
| 2020/0274859 A1* | 8/2020 | Melo | ..................... | H04L 9/0897 |
| 2020/0374121 A1* | 11/2020 | Momchilov | .......... | H04L 9/0825 |
| 2021/0097535 A1* | 4/2021 | Osborn | ................. | H04L 9/3271 |
| 2021/0241266 A1* | 8/2021 | Kamal | ............. | G06Q 20/40145 |
| 2022/0014358 A1* | 1/2022 | Retaureau | ............... | H04L 9/085 |
| 2022/0166623 A1* | 5/2022 | Alfonso Reyes | ....... | G06F 21/34 |
| 2022/0321354 A1* | 10/2022 | Ladd | ..................... | H04L 9/3252 |
| 2022/0407721 A1* | 12/2022 | Queralt | ............... | H04W 12/069 |
| 2023/0020656 A1* | 1/2023 | Momchilov | ........ | H04L 63/0807 |
| 2023/0025320 A1* | 1/2023 | McCarty | ............ | G06Q 20/3829 |
| 2023/0063417 A1* | 3/2023 | Piri | ....................... | H04W 12/04 |
| 2023/0155998 A1* | 5/2023 | Gero | ..................... | H04L 9/3247 |
| | | | | 726/4 |
| 2024/0039707 A1* | 2/2024 | McDonald | ........ | H04W 12/0433 |
| 2024/0283664 A1* | 8/2024 | Islam | .................... | H04L 9/3271 |

OTHER PUBLICATIONS

Cappalli et al. "Web Authentication: An API for accessing Public Key Credentials Level 3" Apr. 3, 2024, pp. 1-243 retrieved at https://w3c.github.io/webauthn/.

* cited by examiner

SYSTEM BOOTSTRAPPING METHOD 200

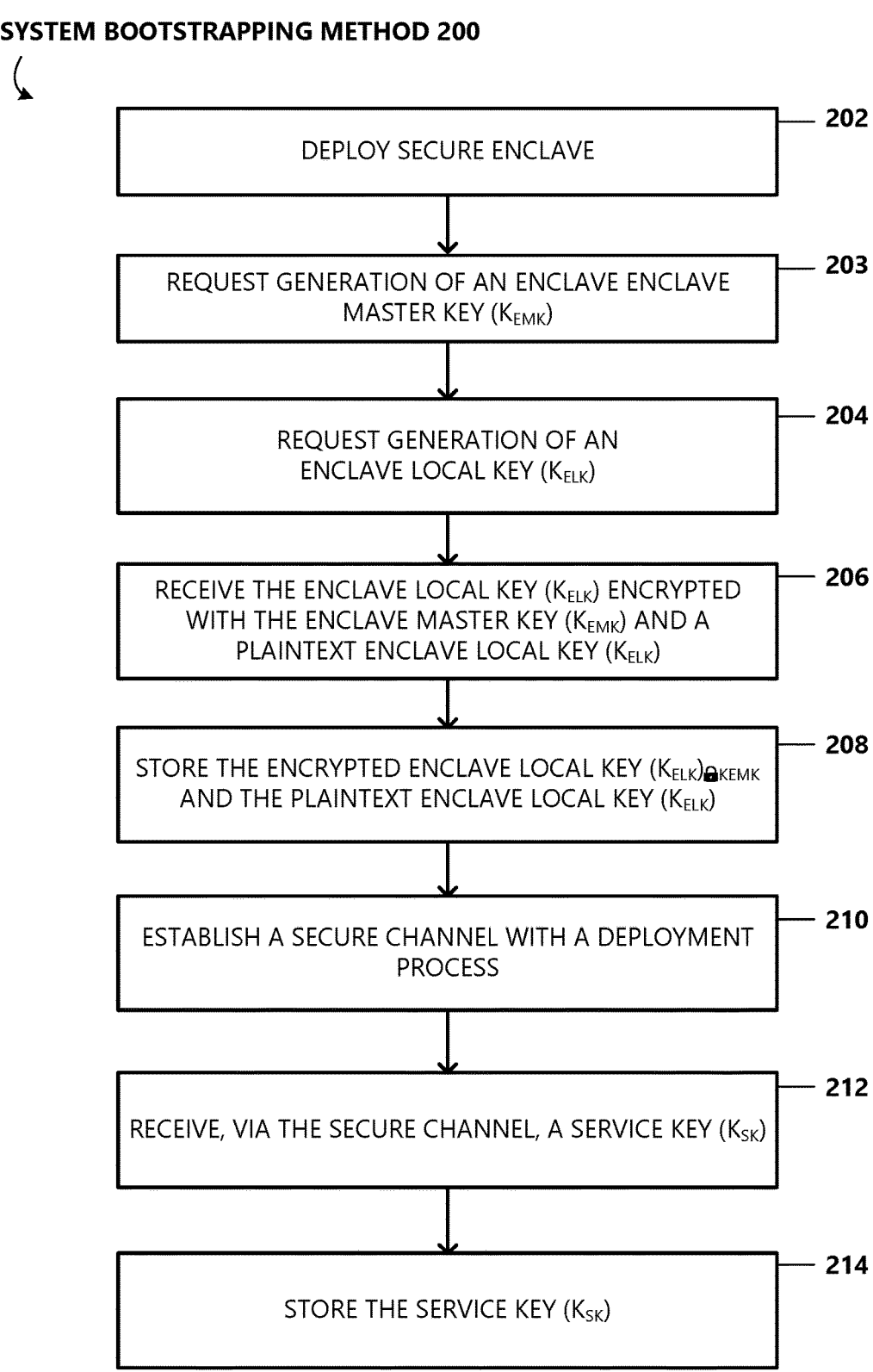

DEPLOY SECURE ENCLAVE — 202

REQUEST GENERATION OF AN ENCLAVE ENCLAVE MASTER KEY ($K_{EMK}$) — 203

REQUEST GENERATION OF AN ENCLAVE LOCAL KEY ($K_{ELK}$) — 204

RECEIVE THE ENCLAVE LOCAL KEY ($K_{ELK}$) ENCRYPTED WITH THE ENCLAVE MASTER KEY ($K_{EMK}$) AND A PLAINTEXT ENCLAVE LOCAL KEY ($K_{ELK}$) — 206

STORE THE ENCRYPTED ENCLAVE LOCAL KEY ($K_{ELK}$)🔒KEMK AND THE PLAINTEXT ENCLAVE LOCAL KEY ($K_{ELK}$) — 208

ESTABLISH A SECURE CHANNEL WITH A DEPLOYMENT PROCESS — 210

RECEIVE, VIA THE SECURE CHANNEL, A SERVICE KEY ($K_{SK}$) — 212

STORE THE SERVICE KEY ($K_{SK}$) — 214

FIG. 2

910 — PROCESSING UNIT

920 — SYSTEM MEMORY

930 — OPERATING SYSTEM

940 — PROGRAM MODULES

102 — AUTHENTICATOR SYSTEM

960 — REMOVEABLE STORAGE

970 — NON-REMOVEABLE STORAGE

980 — COMMUNICATION SYSTEM(S)

990 — INPUT/OUTPUT DEVICES

COMPUTING DEVICE 900

OTHER COMPUTING DEVICES — 995

AUTHENTICATION WITH CLOUD-BASED SECURE ENCLAVE

CROSS-REFERENCE TO RELATED APPLICATIONS

This application claims the benefit of U.S. Provisional Patent Application No. 63/482,710, titled "AUTHENTICATION WITH CLOUD-BASED SECURE ENCLAVE," filed Feb. 1, 2023, which is incorporated by reference herein in its entirety.

BACKGROUND

Web Authentication (WebAuthn) is a protocol based on public-key cryptography that protects user data and prevents unauthorized access to sensitive information. In examples, at least three actors participate in this authenticator system: a server (e.g., a relying party), a client (e.g., a web browser or application), and a WebAuthn authenticator. WebAuthn has two flows, registration and assertion. Upon registration, the relying party may request a new WebAuthn credential from the authenticator, via the browser. In examples, the authenticator creates a pair of keys, one secret and one public. The public key is returned to the server via the browser, and the secret key remains on the authenticator. In examples, during assertion, the server sends a random challenge to the authenticator via the client. During assertion, the authenticator may use the secret key to sign the challenge and the signed challenge is returned to the website via the client. The server is then able to verify the signed challenge using the matching public key.

The Fast IDentity Online (FIDO) Alliance has asserted that WebAuthn is resistant to threats of phishing, credential stuffing, and other remote attacks. The credential is bound to a web origin. Thus, phishing resistance is provided by the system preventing credentials from being used outside the boundary of the source website. Additionally, in contrast to password-based authentication or multi-factor authentication (MFA), there is no shared secret between the authenticator and the relying party. For instance, in password-based authentication and MFA, a relying party stores sensitive information that can be exploited via a server breach. WebAuthn is resistant to credential stuffing and remote attacks as there is no shared secret between the client and the relying party; the relying party only holds a public key, which is not valuable to an attacker. Additionally, every credential is unique.

Traditionally, WebAuthn authentication relies on dedicated hardware such as a security USB key or hardware that is part of the user-owned computing device (e.g., a Trusted Platform Module or on-device secure enclave), within which the key-pair credentials are created and the challenges are signed. Synced passkeys are a type of WebAuthn credential that work on several user devices by securely synchronizing the secret key of the WebAuthn credential. The WebAuthn secret key may comprise the most valuable material of this authenticator system, and typically this key is stored securely within an authenticator. One security aspect of WebAuthn is that the secret key should never be available to the user's general-purpose computing device, as allowing this could make the secret key vulnerable to theft if the device was compromised.

On-device secure enclaves are typically built into a hardware computer system including specific technologies that facilitate protection of WebAuthn secret keys. Such secure enclaves are a separate system from the general-purpose central processing unit (CPU), random-access memory (RAM) and associated input/output processes and devices (I/O), whereby the processing that takes place within the secure enclave is not readily accessible from the general-purpose computer system, and strict controls are in place to manage data going into and coming out of the secure enclave. The same can be said for security hardware keys. For instance, these keys do not expose the circuitry that handles the secret key to the transport layers that interface with the general-purpose computer system, such as USB, near-field communication (NFC), or BLUETOOTH.

The same protections cannot be provided, however, by browser extension software running on a simple general-purpose computer system. For example, a desktop browser extension application has limited abilities to protect secret keys and, thus, may resort to placing the key in the general RAM of the system via the browser. This may be due to browsers not exposing capabilities provided by the operating system to the extensions and/or to operating systems not exposing capabilities to third-party applications. Exploits can be more easily developed or discovered by an attacker that can access information stored in such a memory space, compared to information stored in a more secure environment of secure enclaves, which are designed to prevent unauthorized access.

Not all user computing devices are equipped with a built-in secure enclave. Thus, even if there was no limitation of browser extensions working with built-in secure enclaves, there would still be scenarios where systems are not equipped with secure enclaves. Software built upon systems that do not have built-in secure enclaves can leave user secret keys vulnerable to attackers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure describe an authenticator system and method for providing secure web authentication (WebAuthn). In examples, cross-platform and cross-device secure WebAuthn usage is enabled via implementation of a cloud-based secure enclave to protect users' secret keys against theft due to a compromised user computing device. A client application (e.g., a regular desktop browser application or mobile application) running on a user computing device interacts with the secure enclave to participate in an authentication process. In examples, secret key material is stored in the cloud-based secure enclave and decryption of the secret key material is performed within the cloud-based secure enclave to provide a highly secure system where the secret key cannot be stolen if the user computing device is compromised. Examples employ secure tunnel communication between the client application and a secure enclave server so that information exchanged between the client application and the secure enclave cannot be intercepted, protecting against unauthorized use of the system—for instance by intercepting the signed challenge.

In an aspect, the present disclosure presents a cloud-based secure enclave of an authentication system of a service provider, comprising: at least one processing unit; and memory storing instructions that, when executed by the at least one processing unit, cause the system to perform operations. In examples, the operations comprise: encrypting an authentication secret key using a user relying party (RP) key; storing the encrypted authentication secret key; receiving, from a user computing device, a first authentication challenge and the user RP key; obtaining the encrypted authentication secret key; decrypting the encrypted authentication secret key using the user RP key; signing the first authentication challenge with the authentication secret key; and providing the signed first authentication challenge to the user computing device.

In another aspect, the present disclosure presents a method, comprising: at a first time, establishing, by a cloud-based secure enclave of an authentication service of a service provider, a first secure communication channel with a first user computing device; sending the first user computing device a first authentication challenge; receiving, from the first user computing device, the first authentication challenge signed by a first secret device key of a first device key pair; verifying the first authentication challenge using a first public device key of the first device key pair; upon successful verification of the first authentication challenge, authenticating the first user computing device as a trusted device of a user of the service provider; storing the first public device key bound to an identifier of the first user computing device and an identifier of the user; at a second time, establishing, by the secure enclave, a second secure communication channel with a second user computing device; sending the second user computing device a second authentication challenge; receiving, from the second user computing device, the second authentication challenge signed by a second secret device key of a second device key pair; verifying the second authentication challenge using a second public device key of the second device key pair and a stored key bound to the identifier of the user; upon successful verification of the second authentication challenge, authenticating the second user computing device as another trusted device of the user; and storing the second public device key bound to an identifier of the second user computing device and the identifier of the user.

In another aspect, the present disclosure presents a system, comprising: at least one processing unit; and memory storing instructions that, when executed by the at least one processing unit, cause the system to: receive, by a cloud-based secure enclave of an authentication service of a service provider and from a first user computing device, a first authentication challenge and a user relying party (RP) key; generate an authentication key pair including an authentication secret key and an authentication public key; encrypt the authentication secret key using a key combination including the user RP key; cause the encrypted authentication secret key to be stored in a data store; provide the first authentication challenge and the authentication public key to the first user computing device; receive, from a second user computing device, a second authentication challenge and the user RP key; obtain the encrypted authentication secret key from the data store; decrypt the encrypted authentication secret key using the key combination including the user RP key; sign the second authentication challenge with the authentication secret key; and provide the signed second authentication challenge to the second user computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

FIG. 2 illustrates a method for initializing a secure enclave for the authenticator system according to an example;

DETAILED DESCRIPTION

Figure 1:
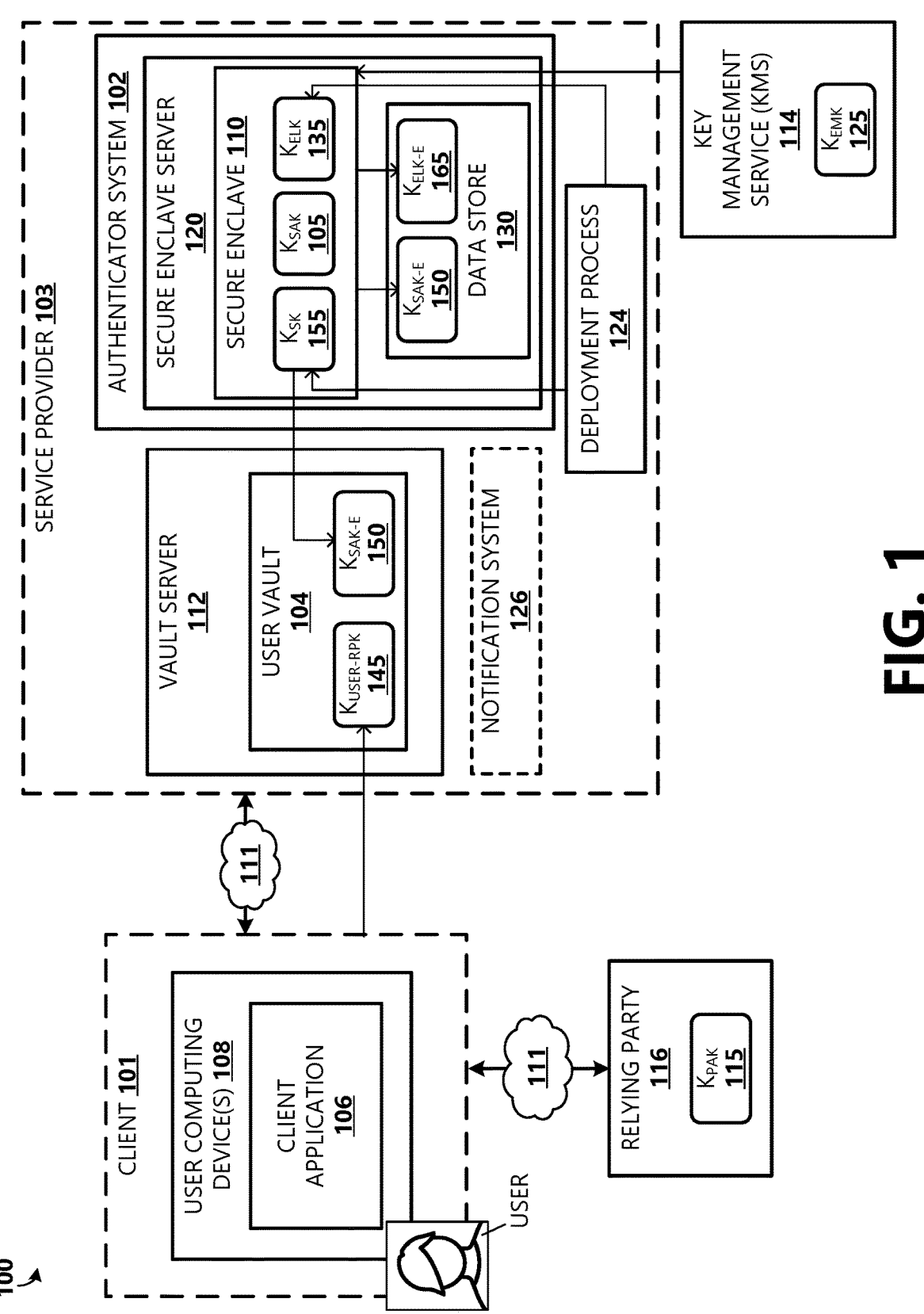
FIG. 1 illustrates an operating environment including a cloud-based authenticator system for providing secure web authentication according to an example.

In the following detailed description, references are made to the accompanying drawings that form a part hereof, and in which are shown by way of illustrations specific embodiments or examples. However, examples may be implemented in many different forms and should not be construed as limited to the embodiments set forth herein; rather, these examples are provided so that this disclosure will be thorough and complete and will fully convey the scope of the examples to those skilled in the art. Examples may be practiced as methods, systems, or devices. Accordingly, examples may take the form of a hardware implementation, an entirely software implementation or an implementation combining software and hardware aspects. The following detailed description is, therefore, not to be taken in a limiting sense.

Exemplary current modern web authentication is based on FIDO standards, where the credential is commonly referred to as a syncable passkey. Example properties of a syncable passkey are that the syncable passkey is resilient to device loss and securely synchronized in order to make it available to all computing devices a user operates. One challenge with synchronization of encrypted data is that the decryption of the secret key material may need to occur in many places across a range of user computing devices. For instance, local device authentication releases the secret key material only at the occasion of authentication after a user verification check (e.g., via biometric means, MFA, password). Non-platform vendor services (e.g., provided by third-party vendors) do not have access to the secure enclave hardware and software that are available on the user computing devices and controlled by platform vendors. Thus, presently, non-platform vendor services may not be able to provide the same level of security afforded to platform vendors. Additionally, not all devices have secure enclave hardware. Present systems and methods may eliminate this limitation by moving the authenticator system boundary, which is typically located on a user computing device with a secure enclave, to include a cloud-based secure enclave.

Examples of the presently disclosed system introduce usability and availability enhancements to the user not currently available via current platform vendor solutions for modern authentication. For example, cross-platform authentication between different platform vendors may require the user to remember on which platform vendor their authentication credential is stored. Cross-platform authentication also currently requires a specialized flow to transfer a challenge from one platform to another in order to sign it using the correct credential. This places a burden on the user where they need to recall where their credential resides and instantiate a cross-platform transfer flow. This flow provided by existing platform vendors may work if the device holding the authentication credentials has a camera that can scan a QR code. Some or all of these limitations and exceptions may be remedied by example systems and methods presently disclosed.

With reference now to FIG. 1, an example operating environment 100 is illustrated in which a cloud-based secure enclave 110 is implemented according to an example. The presently disclosed systems and methods leverage an authenticator system 102 that includes the cloud-based secure enclave 110 and a secure communication channel between the secure enclave 110 and a client 101 (e.g., client application 106 operating on a user computing device 108) to provide secure cross-platform and cross-device modern web authentication (WebAuthn). In examples, a service provider is an entity or organization that offers a particular service to users, where the service uses the authenticator system 102 to provide a secure way for users to verify their identity to ensure the security and privacy of sensitive user data. The service provider 103 may own the authenticator system 102. The client application 106 may include a web browser, mobile application, or browser extension software that users utilize to interact with the service provided by the service provider and the authenticator system 102. Example types of user computing devices 108 include a mobile phone, a tablet computing device, a laptop computing device, a desktop computing device, a gaming device, a smart television device, a smart vehicle, among other devices. While only one user computing device 108 is illustrated in the example operating environment 100, any number of user computing devices 108 may be used.

In examples, the secure enclave 110 is located on a secure enclave server 120 and is accessible via the client application 106 over one or a plurality of networks 111 (e.g., a local-area network, a wide-area network, the Internet, among other types of networks). The secure enclave 110 may be a hardware-based or software-based isolated environment within the secure enclave server 120, where the secure enclave 110 may be designed to protect sensitive data and execute trusted code in isolation from the main operating system and other applications running on the secure enclave server 120. In examples, the secure enclave server 120 is owned and operated by a secure enclave provider on behalf of the service provider 103.

One example service provided by the service provider 103 is a password management service that securely stores and manages users' login (authentication) credentials/keys for access to various online accounts and services (e.g., a website, database, or other resource). The various online accounts and services may be provided by one or more relying parties 116, where the relying parties 116 require user authentication for access to protected resources. In examples, a user authentication key stored by the service provider 103 includes a secret authentication key ($K_{SAK}$) 105 of an asymmetric key pair, where a public authentication key ($K_{PAK}$) 115 of the key pair is provided to a corresponding relying party 116 to authenticate the user (e.g., to a service or website provided by the relying party 116). The authentication key pair are unique to the user and the relying party 116.

According to an aspect, the (plaintext) secret authentication key ($K_{SAK}$) 105 is encrypted for storage by the service provider 103 by a combination of keys. Encryption of the plaintext secret authentication key ($K_{SAK}$) 105 and decryption of the encrypted secret authentication key ($K_{SAK-E}$) 150 are successfully performed only inside the secure enclave 110 and only when using all the keys in the combination. In some implementations, the combination of keys includes a key from the user, a key from the service provider 103, and a key from the secure enclave 110. In other implementations, fewer keys are used (e.g., a key from the user and a key from the service provider 103). In further implementations, additional keys are used. In examples, the plaintext secret authentication key ($K_{SAK}$) 105 is never outside the boundary of the secure enclave 110. In further examples, the encrypted secret authentication key ($K_{SAK-E}$) 150 can be synchronized and made available to the user across a plurality of the user computing devices 108 and the user does not need to know where the encrypted secret authentication key ($K_{SAK-E}$) 150 resides (e.g., unlike current methods, where users may be required to remember on which platform vendor their authentication credential is stored and/or where a specialized flow may be required to transfer a challenge from one platform to another in order to sign it using the correct authentication credential). That is, any platform on which the client application 106 operates to allow the user to access a stored authentication key can be used to interoperate with the authenticator system 102.

The service provider 103 may store encrypted sensitive user data in one or more storage systems. One example storage system is a user vault 104 hosted on at least one vault server 112 owned and operated by the service provider 103. In examples, the user vault 104 is a database component that stores personal user data and is protected by a vault secret known only to the user. The vault secret may be used to encrypt data to store with the service provider 103. In some examples, the vault secret is a password provided by the user combined with a key derivation function to create a cryptographic key. In examples, the user vault 104 is synchronized to a plurality of the user's user computing devices 108 using the client application 106. Another example storage system includes other types of secure data stores 130 (e.g., a database, object storage service, or other data storage and retrieval resource) that reside on the secure enclave server 120.

In an example implementation, the key from the user in the combination of keys used to encrypt and decrypt the authentication key includes a user RP key (KUSER-RPK) 145. In examples, the user RP key (KUSER-RPK) 145 is a unique cryptographic key per relying party authentication credential. In examples, the user RP key (KUSER-RPK) 145 is generated by the client application 1016 and stored in the user vault 104. In further examples, the user RP key (KUSER-RPK) 145 is created and accessed based on authentication of the user with the secure enclave 110. According to an example implementation, the user may be required to authenticate with the secure enclave 110 via the client application 106 and through a secure channel between the client application 106 and the secure enclave 110. The authentication may be based on enrollment of a trusted user computing device 108. For instance, the client application 106 may exchange a public key of an asymmetric device-enclave key pair with the secure enclave 110, where the secret key may be stored on the user computing device 108 to sign challenges and the public key is sent to and stored by the secure enclave 110 to verify signatures of challenges are from the trusted user computing device 108. According to an aspect, the user may use a plurality of trusted user computing devices 108 to access the secure enclave 110, where each trusted device has a corresponding unique device-enclave key stored by the secure enclave 110. Upon authentication of a user and a trusted user computing device 108, the client application 106 may release the user RP key (KUSER-RPK) 145 to the secure enclave 110 for encrypting/decrypting their secret authentication key. In examples, the user RP key (KUSER-RPK) is made available to the secure enclave 110 only when required (e.g., when using the secret authentication key ($K_{SAK}$) 105 to sign a relying party challenge). In some implementations, release of the RP key (KUSER-RPK) may include a plurality of user authentication layers, such as with access policies that allow only the user to access the user RP key (KUSER-RPK) 145. For instance, policies may be based on authentication of the user, where user authentication may be based on local authentication using one or a combination of hardware- or software-based authentication mechanisms available on the user computing device 108, (e.g., such as facial recognition, fingerprint recognition, retina recognition, voice recognition, PIN entry, user password entry), etc.

In an example implementation, the key from the user in the combination of keys used to encrypt and decrypt the authentication key includes a user RP key ($K_{USER-RPK}$) 145. In examples, the user RP key ($K_{USER-RPK}$) 145 is a unique cryptographic key per relying party authentication credential. In examples, the user RP key ($K_{USER-RPK}$) 145 is generated by the client application 106 and stored in the user vault 104. In further examples, the user RP key ($K_{USER-RPK}$) 145 is created and accessed based on authentication of the user with the secure enclave 110. According to an example implementation, the user may be required to authenticate with the secure enclave 110 via the client application 106 and through a secure channel between the client application 106 and the secure enclave 110. The authentication may be based on enrollment of a trusted user computing device 108. For instance, the client application 106 may exchange a public key of an asymmetric device-enclave key pair with the secure enclave 110, where the secret key may be stored on the user computing device 108 to sign challenges and the public key is sent to and stored by the secure enclave 110 to verify signatures of challenges are from the trusted user computing device 108. According to an aspect, the user may use a plurality of trusted user computing devices 108 to access the secure enclave 110, where each trusted device has a corresponding unique device-enclave key stored by the secure enclave 110. Upon authentication of a user and a trusted user computing device 108, the client application 106 may release the user RP key ($K_{USER-RPK}$) 145 to the secure enclave 110 for encrypting/decrypting their secret authentication key. In examples, the user RP key ($K_{USER-RPK}$) is made available to the secure enclave 110 only when required (e.g., when using the secret authentication key ($K_{SAK}$) 105 to sign a relying party challenge). In some implementations, release of the RP key ($K_{USER-RPK}$)

may include a plurality of user authentication layers, such as local authentication using one or a combination of hardware- or software-based authentication mechanisms available on the user computing device 108 (e.g., facial recognition, fingerprint recognition, retina recognition, voice recognition, PIN entry, user password entry).

In an example implementation, the key from the secure enclave 110 in the combination of keys used to encrypt and decrypt the authentication secret key includes an enclave local key ($K_{ELK}$) 135. In examples, the enclave local key ($K_{ELK}$) 135 is generated within a key management service (KMS) 114 (e.g., a component provided by a provider of the secure enclave 110). According to an example implementation, a first symmetric cryptographic key (an enclave master key ($K_{EMK}$) 125) is generated within the KMS 114 and includes access policies to grant access to the secure enclave 110 only. The access policies may be based on information provided by an attestation from the secure enclave 110, where, when a request is sent from the secure enclave 110 to the KMS 114 for use of the enclave master key ($K_{EMK}$) 125, the attestation is matched with the access policies to grant or deny the request. In some examples, when the secure enclave 110 is deployed, it requests, from the KMS 114, two versions of the enclave local key ($K_{ELK}$) 135: a plaintext key (referred to generally as, the enclave local key ($K_{ELK}$) 135) and an encrypted key, where the enclave local key ($K_{ELK}$) 135 is encrypted with the enclave master key ($K_{EMK}$) 125 (referred to as an encrypted enclave local key ($K_{ELK-E}$) 165). The encrypted enclave local key ($K_{ELK-E}$) 165 may be encrypted just for the secure enclave 110 so that no data is leaked and cannot be exported outside the KMS 114. Encryption and decryption functions with the enclave master key ($K_{EMK}$) 125 may be protected by access policies of the KMS 114, where the secure enclave 110 may require authentication to request encryption of the enclave local key ($K_{ELK}$) 135 or decryption of the encrypted enclave local key ($K_{ELK-E}$) 165. According to some examples, the enclave local key ($K_{ELK}$) 135 is stored by the secure enclave 110 in volatile memory (e.g., RAM). In further examples, the secure enclave 110 requests a parent server (e.g., the secure enclave server 120 or another server) to store the encrypted enclave local key ($K_{ELK-E}$) 165. Thus, if the secure enclave 110 reboots or a new instance of the secure enclave 110 is deployed, the new instance can request the encrypted enclave local key ($K_{ELK-E}$) 165 from the secure enclave server 120 that the KMS 114 can then decrypt with the enclave master key ($K_{EMK}$) 125. This way, the enclave local key ($K_{ELK}$) 135 is never in plaintext outside a secured environment, such as the secure enclave 110 or the KMS 114.

In an example implementation, the key from the service provider 103 in the combination of keys used to encrypt and decrypt the authentication secret key includes a service key ($K_{SK}$) 155. In some examples, the service key ($K_{SK}$) 155 is a symmetric cryptographic key that is stored by the service provider 103 and that is made available to the secure enclave 110 by the deployment process 124 of the secure enclave 110. For instance, when confirmation is made that the secure enclave 110 is operational in the bootstrapping phase of the deployment process 124, the service key ($K_{SK}$) 155 may be provided via a secure channel with the secure enclave 110 and unsealed.

In examples, the above-described key arrangement guarantees isolation and availability of the secret authentication key ($K_{SAK}$) 105 within a specific secure environment. For instance, the enclave local key ($K_{ELK}$) 135 and the service key ($K_{SK}$) 155 are available in the secure enclave 110 and the user RP key ($K_{USER\text{-}RPK}$) 145 is made available only when required (e.g., when the secret authentication key ($K_{SAK}$) 105 is being used to sign an authentication challenge). Neither the secure enclave provider nor the service provider 103 can gain access to the secret authentication key ($K_{SAK}$) 105 due to the key arrangement. For instance, service provider isolation may be guaranteed due to the dependency and inaccessibility of two other keys: the user RP key ($K_{USER\text{-}RPK}$) 145 and the enclave local key ($K_{ELK}$) 135. Secure enclave provider isolation may be guaranteed due to the dependency and inaccessibility of the user RP key ($K_{USER\text{-}RPK}$) 145 and the service key ($K_{SK}$) 155. The user computing device 108 may also be isolated from accessing the secret authentication key ($K_{SAK}$) 105, which may be useful when in the case of a compromised user computing device 108. That is, the secret authentication key ($K_{SAK}$) 105 cannot be stolen by a malicious actor for use outside of the authenticator system 102.

In some examples, the presently disclosed authentication system 102 may be reinforced with a notification system 126 that ensures information and feedback regarding authenticator system use is available to the user for scrutiny. The following events are example events that may trigger a notification that may be added to an audit log for analysis: new device registration with the secure enclave 110, authentication key generation, authentication key utilization, authentication failures, a modification on a distribution list for such notification system 126. Notifications may be delivered in substantially real time to the user and are configurable. In examples, the notifications may stem only from events taking place within the secure enclave 110, thus ensuring only legitimate events are logged or notified.

With reference now to FIG. 2, an example method 200 for establishing a secure enclave 110 is illustrated according to an example. Performing the operations in the example method 200 cause a secure enclave instance to be operational on a secure enclave server 120 to perform intended functions, such as various processes in FIGS. 3, 4, 5, 6A, and 6B and operations of data flow 700 in FIG. 7 and data flow 800 in FIG. 8. At operation 202, an instance of the secure enclave 110 is deployed on a secure enclave server 120. In example implementations, the secure enclave 110 is deployed to serve a user of the service provider 103 and the authenticator system 102 described herein. At operation 203, in a bootstrapping phase of the deployment process 124 of the secure enclave 110, a request is made to the KMS 114 associated with the secure enclave provider to generate an enclave master key ($K_{EMK}$) 125 for the secure enclave 110. In examples, the enclave master key ($K_{EMK}$) 125 is generated within the KMS 114 and includes access policies to grant access only to the secure enclave 110.

A handshake operation may be performed to build a secure communication channel between the secure enclave 110 and the KMS 114. At operation 204, a request to generate an enclave local key ($K_{ELK}$) 135 is sent to the KMS 114 via the secure communication channel. When access policies allow for the request from operation 204 to be granted (e.g., based on secure enclave cryptographic attestation), the enclave local key ($K_{ELK}$) 135 for the secure enclave 110 is generated by the KMS 114. Additionally, the (plaintext) enclave local key ($K_{ELK}$) 135 is encrypted with the enclave master key ($K_{EMK}$) 125 to create an encrypted enclave local key ($K_{ELK\text{-}E}$) 165. At operation 206, the encrypted enclave local key ($K_{ELK\text{-}E}$) 165 and the plaintext enclave local key ($K_{ELK}$) 135 are sent to and received by the secure enclave 110.

At operation 208, the received keys are stored. In some examples, the secure enclave 110 stores the plaintext enclave local key ($K_{ELK}$) 135 in volatile memory (e.g., RAM). In further examples, the secure enclave 110 requests a parent server (e.g., the secure enclave server 120 or another server) to store the encrypted enclave local key ($K_{ELK\text{-}E}$) 165. The parent server may then store the encrypted enclave local key ($K_{ELK\text{-}E}$) 165 in a data store 130. In case of a reboot of the secure enclave 110 or deployment of a new instance of the secure enclave 110, the encrypted enclave local key ($K_{ELK\text{-}E}$) 165 may be retrieved by the secure enclave 110 and decrypted by the KMS 114 with the enclave master key ($K_{EMK}$) 125.

In examples, when the secure enclave 110 is instantiated and receives the enclave local key ($K_{ELK}$) 135, the secure enclave 110 is in a sealed mode and is in condition to receive a service key ($K_{SK}$) 155 to start serving clients. For instance, when the secure enclave 110 is determined as being operational, a secure communication channel may be established with an automated deployment workflow (e.g., the deployment process 124) at operation 210.

At operation 212, the service key ($K_{SK}$) 155 is received by the secure enclave 110 via the secure communication channel. In some examples, the secure enclave 110 authenticates the deployment process 124 with a secret value generated at an initialization step. Thus, the deployment process 124 may pass the secret value through the secure communication channel to the secure enclave 110 along with the service key 155 key to prove to the secure enclave 110 that it is the correct service key 155. At operation 214, the service key 155 is stored by the secure enclave 110. Thus, the secure enclave 110 is ready to serve clients, such as, by providing secure storage and processing for cryptographic keys (e.g., one or more secret authentication keys ($K_{SAK}$)), handling sensitive transactions, and/or executing trusted applications in a secure and isolated manner.

Figure 3:
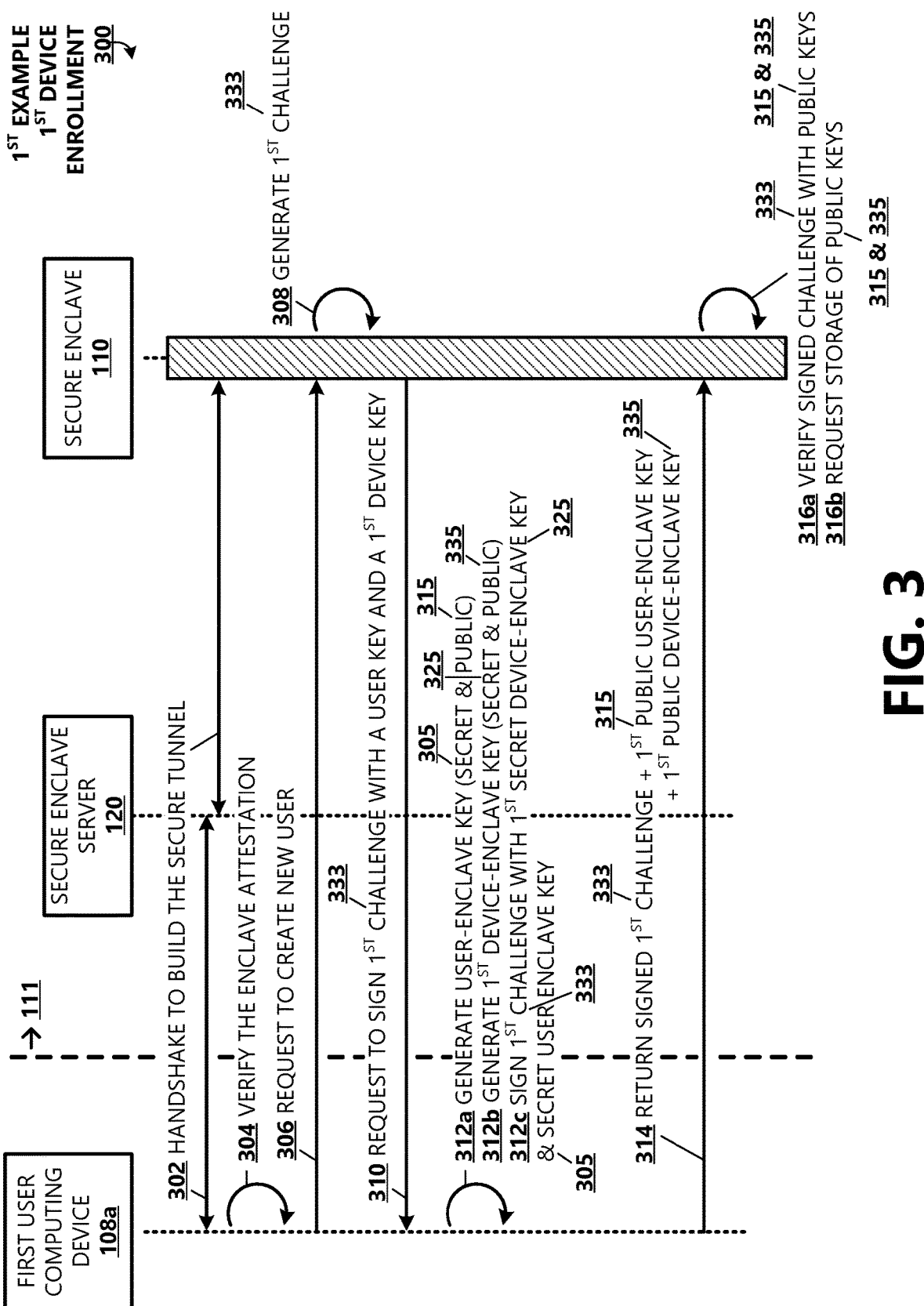
FIG. 3 illustrates a system flow for enrolling a first client for a new user with the authenticator system according to a first example.
Figure 4:
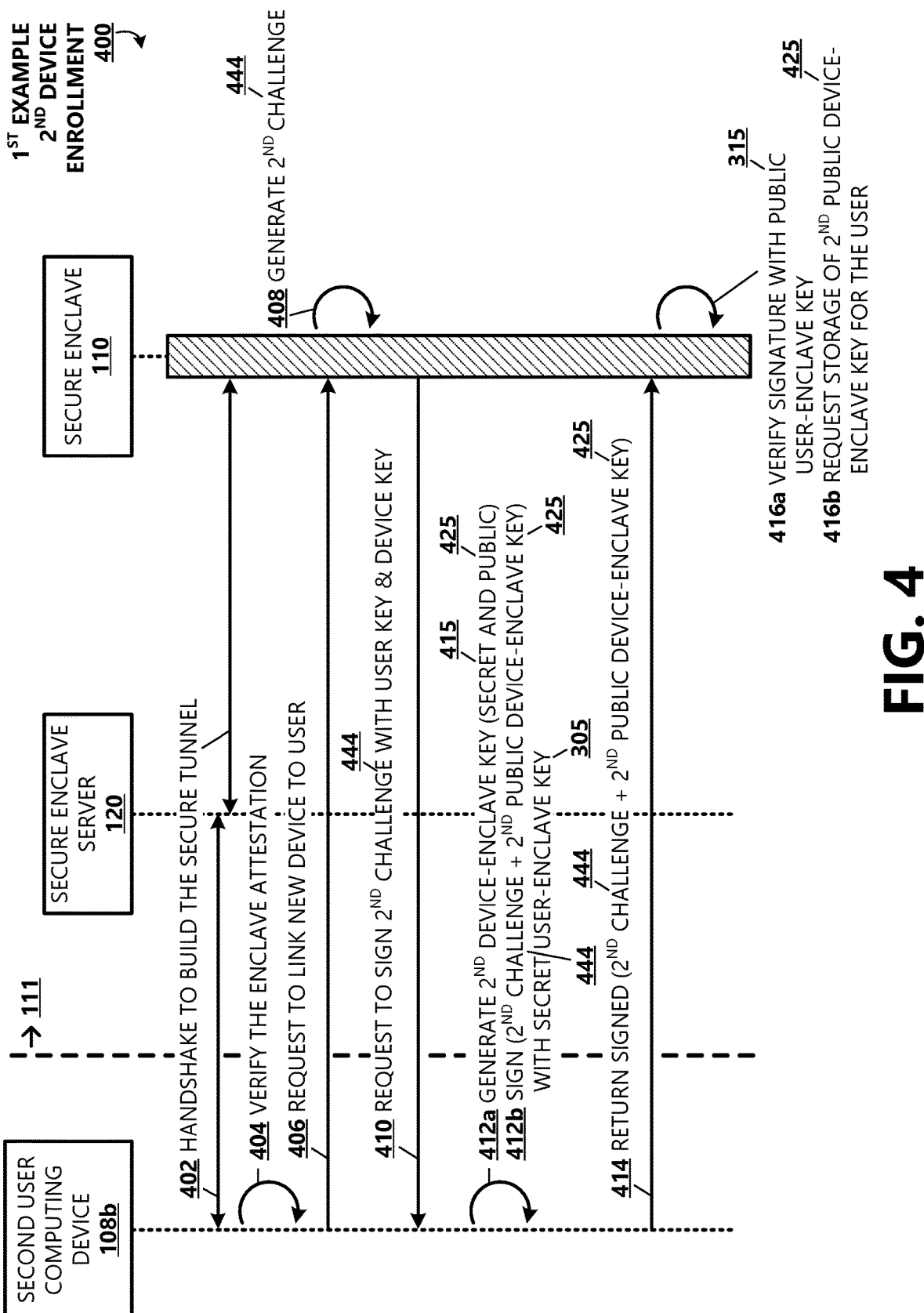
FIG. 4 illustrates a system flow for enrolling a second client for the user according to a first example.
Figure 5:
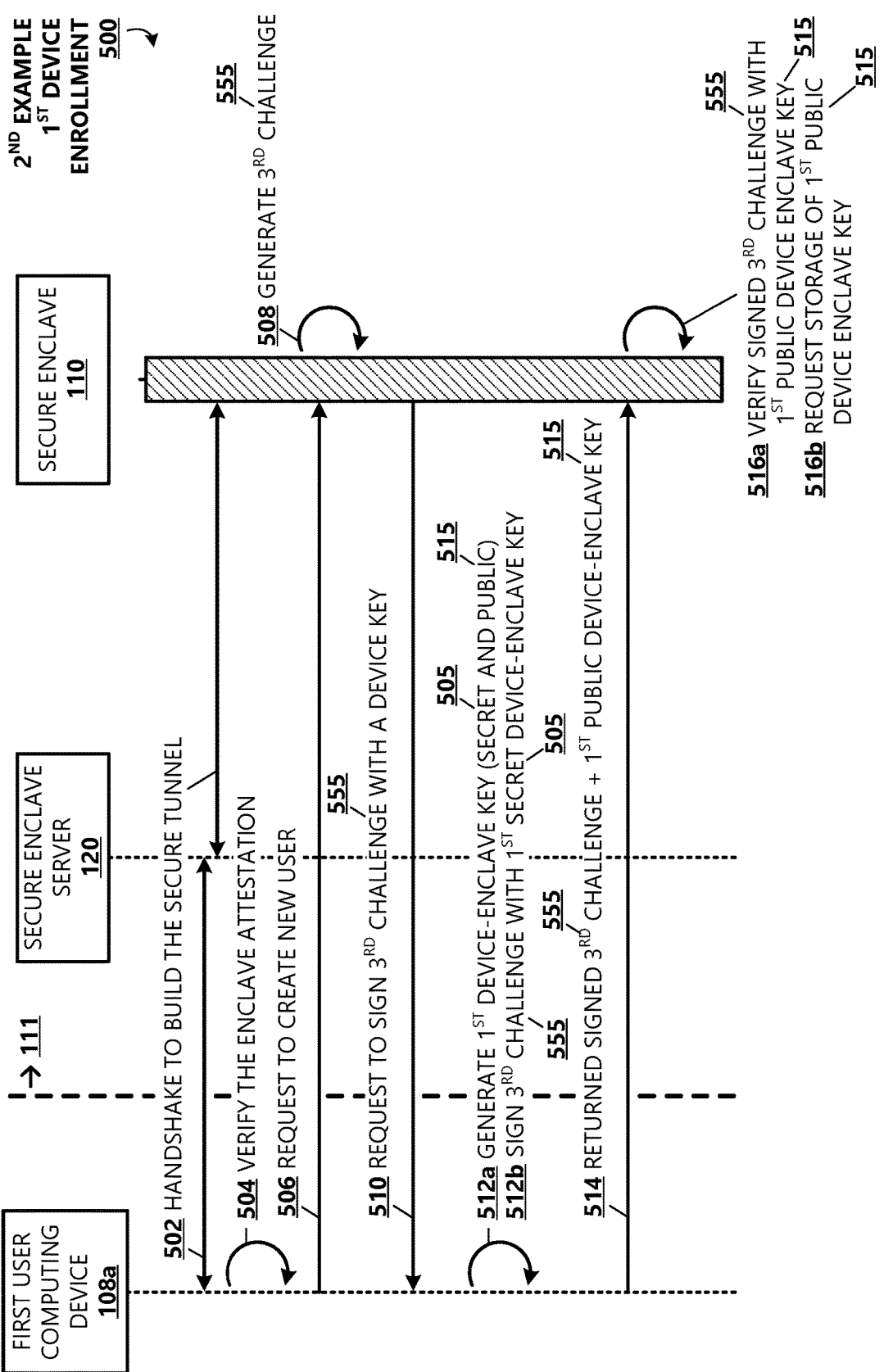
FIG. 5 illustrates a system flow for enrolling a first client for a new user with the authenticator system according to a second example.
Figure 6A:
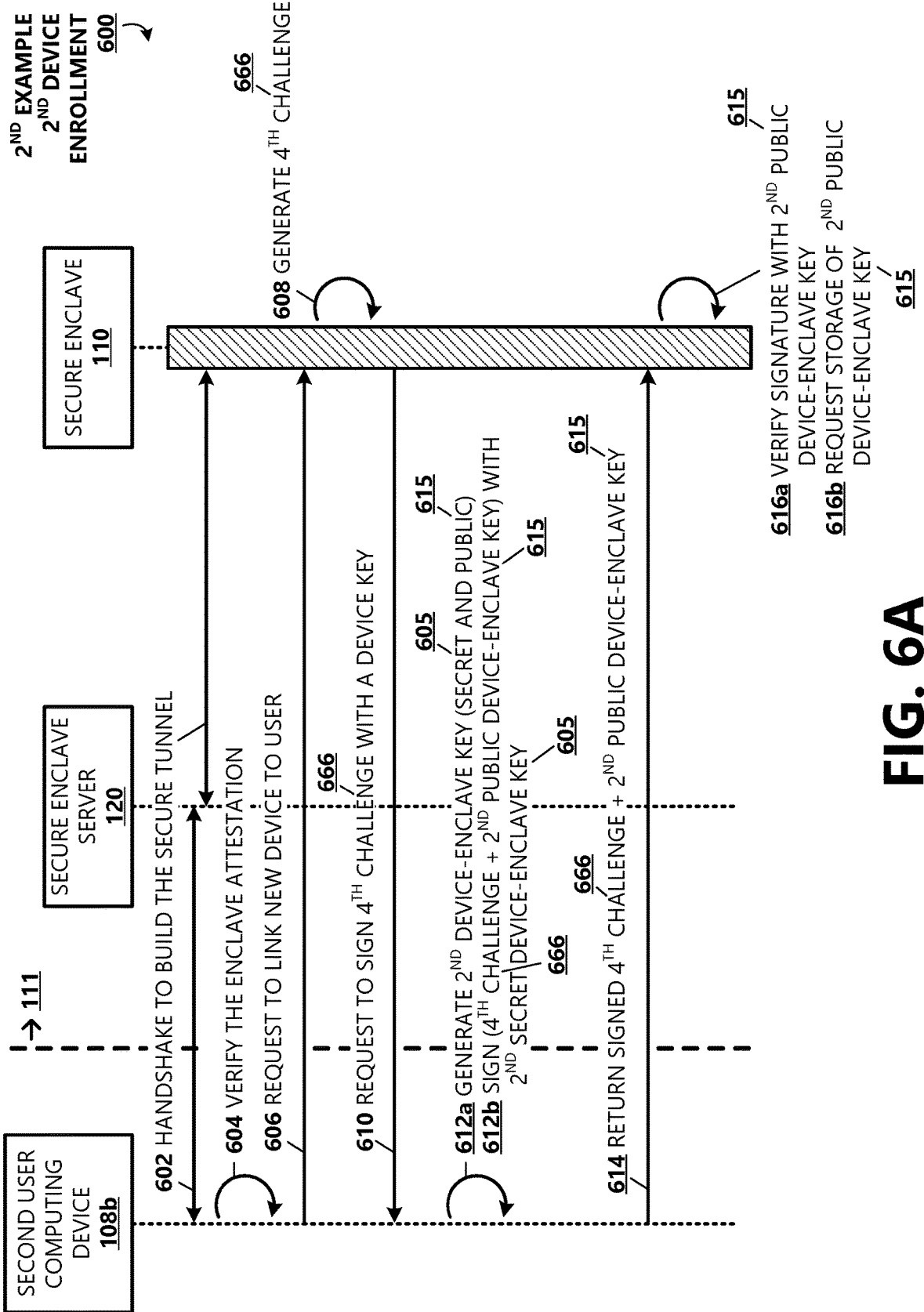
FIGS. 6A and 6B illustrate a system flow for enrolling a second client for the user according to a second example.
Figure 6B:
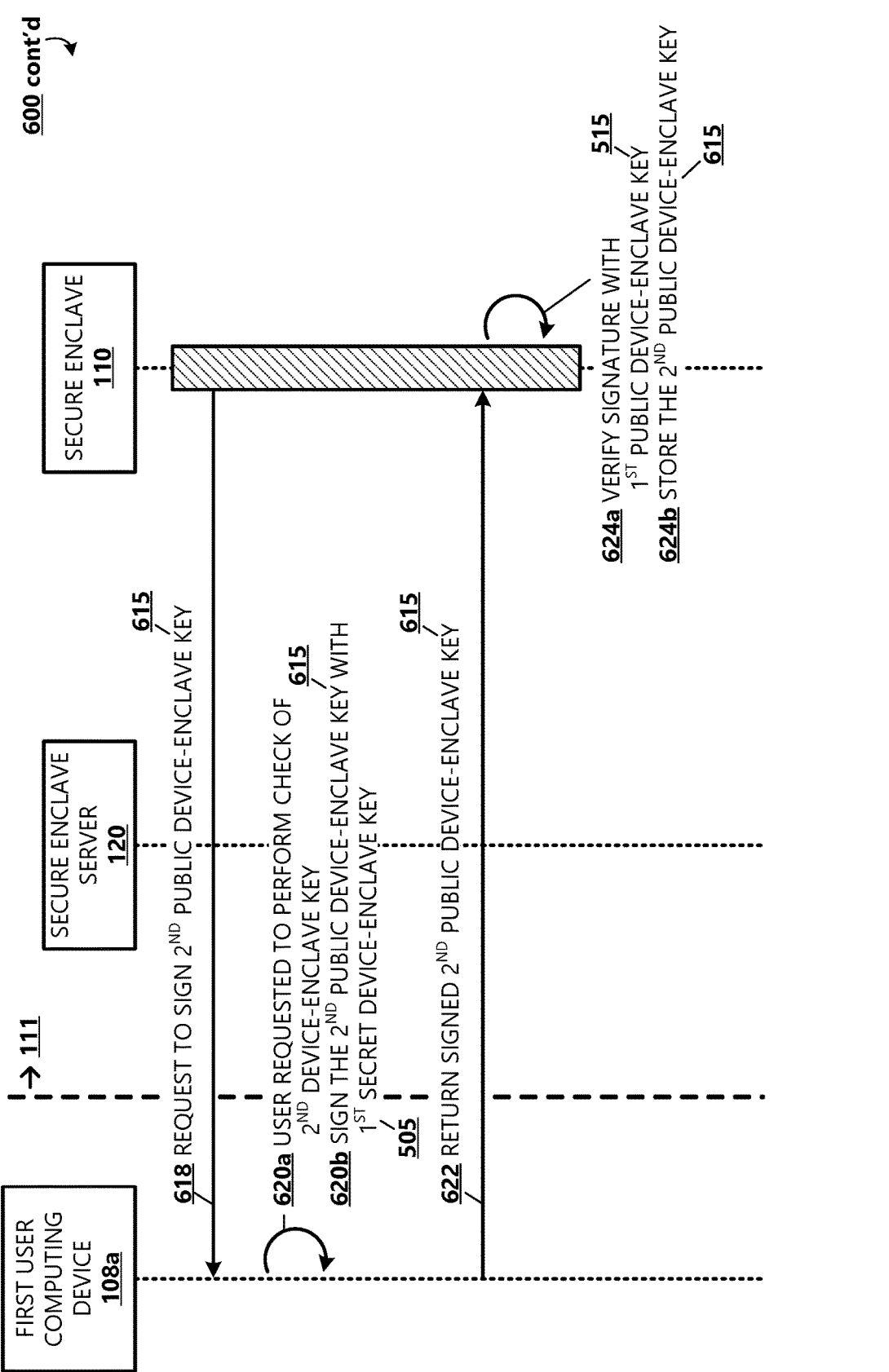

FIGS. 3 and 4 illustrate system flow diagrams of a first example enrollment process of user computing devices 108 for a user account, where the first example enrollment process includes implementation of a user-enclave key in addition to the device-enclave key. The first example enrollment process includes enrollment of a first user computing device 108a, as depicted in FIG. 3, and enrollment of a second user computing device 108b, as depicted in FIG. 4. A second example enrollment process that does not implement a user-enclave key is depicted in FIGS. 5, 6A, and 6B and is described below.

With reference now to FIG. 3, in the first example enrollment process 300 of the first user computing device 108a, a first set of communications exchanged between the client application 106 operating on the first user computing device 108a and the secure enclave server 120 and secure enclave 110 are represented as communication 302. The first set of communications are exchanged to build a secure communication channel (tunnel) between the client application 106 and the secure enclave 110. Operations performed by the client application 106 operating on the first user computing device 108a may be referred to generally as being performed by a first client 101a or as being performed by the first user computing device 108a. One example method of building the secure communication channel includes a handshake operation, where cryptographic primitives are generated by the first user computing device 108a including a public client key ($K_{CLIENT\text{-}PK}$) and a secret client key ($K_{CLIENT\text{-}SK}$). The public client key ($K_{CLIENT\text{-}PK}$) is provided to the secure enclave 110. When the public client key ($K_{CLIENT\text{-}PK}$) is received by the secure enclave 110, the secure enclave 110 generates the cryptographic primitives including a public server key ($K_{SERVER-PK}$) and a secret server key ($K_{SERVER-SK}$). The secure enclave 110 further generates session keys using the public client key ($K_{CLIENT-PK}$) and the secret server key ($K_{SERVER-SK}$) and an attestation with an embedded public server key ($K_{SERVER-PK}$). The secure enclave 110 may then send the attestation back to the first user computing device 108a, which verifies (operation 304) the attestation via a chain of trust and Platform Configuration Registers (PCRs). For instance, PCRs in a Trusted Platform Module (TPM) may be used to store hash values that represent the integrity of different system components for establishing and verifying the trustworthiness of a computer system's boot process and configuration in trusted computing environments. The first user computing device 108a extracts the public server key ($K_{SERVER-PK}$) from the attestation and generates session keys using the secret client key ($K_{CLIENT-SK}$) and the public server key ($K_{SERVER-PK}$). At this point, the first user computing device 108a and the secure enclave 110 may exchange data by encrypting and authenticating with the session keys, where the first user computing device 108a has authenticated the secure enclave 110 with which it is communicating.

At this point, however, the secure enclave 110 has not yet authenticated the first user computing device 108a. Communication 306 represents a request sent from the first user computing device 108a and received by the secure enclave 110 to create a new user account (e.g., register the user as a new user and assign the new user a user identifier (ID)) with the authenticator system 102. In some examples, the secure enclave 110 generates a user ID and assigns the user ID to the user account and user.

Process 308 represents the secure enclave 110 generating a first random challenge 322 to be signed by the first user computing device 108a. In some implementations, the secure enclave 110 requests the first user computing device 108a to sign the first challenge 322 using a plurality of keys (e.g., a key connected to the user and a key connected to the first user computing device 108a), which is represented by communication 310.

Processes 312a-212c may be performed by the first user computing device 108a in response to receiving communication 310. Process 312a represents creating a first asymmetric key pair connected to the user (e.g., a user-enclave key pair). In some examples, a secret user-enclave key 305 of the user-enclave key pair is stored in the user vault 104 encrypted with the user's vault secret, where the encrypted user vault 104 is synchronized to a plurality of the user's computing devices 108a-108n and accessed using the client application 106. Thus, the secret user-enclave key 305 of the key pair is controlled by the user.

Process 312b represents generating a second asymmetric key pair (e.g., a first device-enclave key pair) by the first user computing device 108a (e.g., on which the client application 106 is operating). Process 312c represents signing the first challenge 322 with the secret user-enclave key 305 and a first secret device-enclave key 325 of the first device-enclave key pair. In examples, the first secret device-enclave key 325 of the key pair is stored locally on the first user computing device 108a. In some implementations, the first secret device-enclave key 325 is stored encrypted in the user vault 104. In other implementations, one or more of the user's user computing devices 108 include a platform authenticator (e.g., a hardware component) that operates as a local secure enclave on the one or more user computing devices 108. Thus, the first secret device-enclave key 325 may be stored in and never leave this hardware component, which may prevent the first secret device-enclave key 325 from being stolen in case the first user computing device 108a is compromised. Moreover, in examples, requesting a signature from the first secret device-enclave key 325 may require a user verification check, such as via a biometric check, PIN entry, etc., to unlock the platform authenticator.

Communication 314 represents the secure enclave 110 receiving the first signed challenge 322 from the first user computing device 108a. Additionally, communication 314 includes a public user-enclave key 315 of the user-enclave key pair and a first public device-enclave key 335 of the first device-enclave key pair for verifying signatures of challenges.

Process 316a represents the secure enclave 110 verifying the first returned challenge 322 using the public user-enclave key 315 and the first public device-enclave key 335. In some implementations, upon successful verification of the signatures, the secure enclave 110 may generate and assign a new device ID to the first user computing device 108a and the first public device-enclave key 335. For instance, the user computing device 108 the new user is using for the first connection may be automatically enrolled for the user ID (e.g., Trust On First Use). In further examples, the secure enclave 110 binds the device ID and first public device-enclave key 335 to the user ID of the user for providing the user a first trusted user computing device 108a.

The secure enclave 110 then stores the public user-enclave key 315 and the first public device-enclave key 335, as represented by process 316b. In some examples, the secure enclave 110 requests storage of the public user-enclave key 315 and/or the first public device-enclave key 335 by the secure enclave server 120. The stored public user-enclave key 315 and the first public device-enclave key 335 may be protected in integrity at rest by the secure enclave 110 by generating a Message Authentication Code (MAC). In an example implementation, the MAC is generated based on an enclave local key ($K_{ELK}$) provided by the KMS 114 and a service key ($K_{SK}$) provided by the service provider 103 during a bootstrapping process of the secure enclave 110. For instance, the MAC may be used to ensure that the stored keys have not been tampered with during storage.

With reference now to FIG. 4, in a first example enrollment process 400 of a second user computing device 108b for the user, a first set of communications 402 are transmitted between the client application 106 operating on the second user computing device 108b and the secure enclave 110 to build a secure communication channel (tunnel). Operations performed by the client application 106 operating on the second user computing device 108b may be referred to generally as being performed by a second client 101b or as being performed by the second user computing device 108b. The secure communication channel may be built using a similar handshake method (402) as in the first example enrollment process 300 of the first user computing device 108a. For instance, the second user computing device 108b may verify (operation 404) an attestation provided by the secure enclave 110 via a chain of trust and PCRs. The secure communication channel may be established and the second user computing device 108b and the secure enclave 110 may exchange data by encrypting and authenticating with session keys. At this point, the second user computing device 108b has authenticated the secure enclave 110 but the secure enclave 110 has not yet authenticated the second user computing device 108b.

Communication 406 represents a request received by the secure enclave 110 and from the second user computing device 108*b* to log the user into the user's account with the authenticator system 102. The request may include information, such as the user ID or another identifier that the secure enclave 110 can use to associate the request with the user. According to an example, the second user computing device 108*b* may be an untrusted user computing device for which a trust relationship may need to be established, where the request corresponds to a request to link an existing user (e.g., user ID associated with the user account) to the second user computing device 108*b*.

Process 408 represents the secure enclave 110 generating a second random challenge 444 and a request for the second user computing device 108*b* to sign the second challenge 444. According to an example implementation, the secure enclave 110 requests the second user computing device 108*b* to generate and provide a key connected to the second user computing device 108*b* and to sign the second challenge 444 with the secret user-enclave key 305. Communication 410 represents the secure enclave 110 sending the second challenge 444 and request to the second user computing device 108*b*.

Processes 412*a* and 412*b* may be performed by the second user computing device 108*b* in response to receiving communication 410. For instance, process 412*a* represents creating a second device-enclave key pair (a second secret device-enclave key 415 and a second public device-enclave key 425) by the second user computing device 108*b*. Process 412*b* represents obtaining the secret user-enclave key 305 from the user vault 104 and signing the second challenge 444 and the second public device-enclave key 425 with the obtained secret user-enclave key 305. For instance, the user vault 104 may be unsealed on the second user computing device 108*b* based on verification of the user's vault secret input on the second user computing device 108*b* to access the secret user-enclave key 305. In examples, the second secret device-enclave key 415 is stored locally on the second user computing device 108*b*. In some implementations, the second secret device-enclave key 415 is stored encrypted in the user vault 104. In other implementations, a platform authenticator operates on the second user computing device 108*b* and stores the second secret device-enclave key 415. Thus, the second secret device-enclave key 415 may never leave this hardware component, which may prevent the second secret device-enclave key 415 from being stolen in case the second user computing device 108*b* is compromised. Moreover, in examples, requesting a signature from the second secret device-enclave key 415 may require a user verification check, such as via a biometric check, PIN entry, etc., to unlock the platform authenticator.

Communication 414 represents the second signed second challenge 444 and second public device-enclave key 425 being returned to and received by the secure enclave 110.

Process 416*a* represents the secure enclave 110 verifying the second returned challenge 444 using the public user-enclave key 315 (associated with the user ID). For instance, the public user-enclave key 315 may be obtained from storage for verification. Upon successful verification, the secure enclave 110 may generate and assign a new device ID to the second user computing device 108*b* and the second public device-enclave key 435. In further examples, the secure enclave 110 binds the device ID and second public device-enclave key 435 to the user ID of the user for providing the user a second trusted user computing device 108*b*. The secure enclave 110 may further store the second public device-enclave key 425 as represented by process 416*b*. In some examples, the stored second public device-enclave key 425 are stored by the secure enclave server 120 and protected in integrity at rest using a MAC based on the enclave local key ($K_{ELK}$) the service key ($K_{SK}$).

The second example enrollment process in which the user-enclave key pair is not implemented is described in relation to FIGS. 5, 6A, and 6B. Referring now to FIG. 5, in the second example enrollment process 500 of a first user computing device 108*a*, a first set of communications 502 represents communications exchanged between the first user computing device 108*a* and the secure enclave server 120 and the secure enclave 110 as part of a handshake process to build a secure communication channel between the client application 106 operating on the first user computing device 108*a* (generally, the first user computing device 108*a*) and the secure enclave 110.

Operation 504 represents a verification process performed by the first user computing device 108*a* to verify an attestation provided by the secure enclave 110, such as via the processes described above with reference to operation 304 of FIG. 3 and 404 of FIG. 4. A secure communication channel may be established between the first user computing device 108*a* and the secure enclave 110, where data may be exchanged by encrypting and authenticating with session keys. At this point, the first user computing device 108*a* has authenticated the secure enclave 110 but the secure enclave 110 has not yet authenticated the first user computing device 108*a*.

Communication 506 represents a request sent from the first user computing device 108*a* and received by the secure enclave 110 to create a new user account (e.g., register the user as a new user) with the authenticator system 102.

Process 508 represents the secure enclave 110 generating an example third challenge 555 to be signed by the first user computing device 108*a*. In examples, the secure enclave 110 requests the first user computing device 108*a* to sign the third challenge 555 using a key connected to the first user computing device 108*a*, which is represented by communication 510.

Processes 512*a* and 512*b* may be performed by the first user computing device 108*a* in response to receiving communication 510. For instance, process 512*a* represents creating an asymmetric first device-enclave key pair including a first secret device-enclave key 505 and a first public device-enclave key 515. Process 512*b* represents signing the third challenge 555 with the first secret device-enclave key 505. In examples, the first secret device-enclave key 505 is stored locally on the first user computing device 108*a* to sign challenges. In some implementations, the second first secret device-enclave key 505 is stored encrypted in the user vault 104. In other implementations, a platform authenticator operates on the first user computing device 108*a* and stores the first secret device-enclave key 505, where the first secret device-enclave key 505 may never leave this hardware component, preventing the first secret device-enclave key 505 from being stolen in case the first user computing device 108*a* is compromised. Moreover, in examples, requesting a signature from the first secret device-enclave key 505 may require a user verification check, such as via a biometric check, PIN entry, etc., to unlock the platform authenticator.

Communication 514 represents the third signed challenge 555 being returned to the secure enclave 110. Additionally, communication 514 includes the first public device-enclave key 515 for verifying signatures of challenges signed by the first user computing device 108*a*. Process 516*a* represents the secure enclave 110 verifying the signature of the returned third challenge 555 using the first public device-enclave key 515. Upon successful verification, the secure enclave 110 identifies the first user computing device 108*a* as a first trusted device for the user. In some examples, the secure enclave 110 generates and assigns a new device ID to the first user computing device 108a and the first public device-enclave key 515. The first user computing device 108a may be automatically enrolled as a trusted device for the user (e.g., based on Trust On First Use). In examples, the secure enclave 110 binds the device ID and first public device-enclave key 515 to the user ID of the user. The secure enclave 110 may store the first public device-enclave key 515, as represented by process 516b. In some examples, the secure enclave 110 requests the secure enclave server 120 to store the first public device-enclave key 515. The stored first public device-enclave key 515 may be protected in integrity at rest by a MAC generated based on the enclave local key ($K_{ELK}$) and the service key ($K_{SK}$).

With reference now to FIG. 6A, in a second example enrollment process 600 of a second user computing device 108b, a first set of communications 602 is transmitted between the second user computing device 108b and the secure enclave 110 to build a secure communication channel (tunnel) between the client application 106 operating on the second user computing device 108b and the secure enclave 110. The secure communication channel may be built using similar handshake methods (302, 402, 502) as in the above user device enrollment examples. At operation 604, the second user computing device 108b may verify an attestation provided by the secure enclave 110 via a chain of trust and PCRs. The secure communication channel may be established and the second user computing device 108b and the secure enclave 110 may exchange data by encrypting and authenticating with session keys. At this point, the second user computing device 108b has authenticated the secure enclave 110 but the secure enclave 110 has not yet authenticated the second user computing device 108b.

Communication 606 represents a request received by the secure enclave 110 and from the second user computing device 108b to log the user into the user's account using an untrusted device. According to an example, the second user computing device 108b is an untrusted user computing device for which a trust relationship may need to be established. The request may correspond to a request to link an existing user (e.g., user ID associated with the user account) to the second user computing device 108b.

Process 608 represents the secure enclave 110 generating a fourth random challenge 666 and a request for the second user computing device 108b to sign the fourth challenge 666 with a key connected to the second user computing device 108b. Communication 610 represents the secure enclave 110 sending the fourth challenge 666 and request to the second user computing device 108b.

Processes 612a and 612b may be performed by the second user computing device 108b in response to receiving communication 610. For instance, process 612a represents creating a second device-enclave key pair (e.g., a second secret device-enclave key 605 and a second public device-enclave key 615) by the second user computing device 108b. Process 612b represents signing the fourth challenge 666 with second secret device-enclave key 605. In examples, the second secret device-enclave key 605 is stored locally on the second user computing device 108b to sign challenges received from the secure enclave 110. In some implementations, the second secret device-enclave key 605 is stored encrypted in the user vault 104. In other implementations, a platform authenticator operates on the second user computing device 108b and stores the second secret device-enclave key 605, where the second secret device-enclave key 605 may never leave this hardware component, preventing the second secret device-enclave key 605 from being stolen in case the second user computing device 108b is compromised. Moreover, in examples, requesting a signature from the second secret device-enclave key 605 may require a user verification check, such as via a biometric check, PIN entry, etc., to unlock the platform authenticator.

Communication 614 represents the second signed fourth challenge 666 and the second public device-enclave key 615 being returned to and received by the secure enclave 110.

Process 616 represents the secure enclave 110 verifying the signature of the fourth challenge 666 using the second public device-enclave key 615. Upon successful verification, the second example second user computing device enrollment process 600 continues to FIG. 6B. Communication 618 represents a request, by the secure enclave 110 and to the first user computing device 108a (e.g., an already-trusted user device for the user), to sign the second public device-enclave key 615 with the first secret device-enclave key 505 to verify the second user computing device 108b is associated with the user.

Processes 620a and 620b may be performed by the first user computing device 108a in response to receiving communication 618. For instance, process 620a represents requesting the client application 106 operating on the first user computing device 108a and/or the user operating the first user computing device 108a to perform a check of the second public device-enclave key 615. In an example implementation, a visual code (e.g., a QR code) may be presented by the untrusted second user computing device 108b and scanned by the trusted first user computing device 108a and verified. In another example implementation, visual codes may be generated by the first 108a and second user computing devices 108b, which are verified to match. Other proximity/out of band methods may be used to verify the second public device-enclave key 615 provided to the first (trusted) user computing device 108a is from the second (untrusted) user computing device 108b. Upon a successful check, process 620b represents the first user computing device 108a signing the second public device-enclave key 615 with the first secret device-enclave key 505.

Communication 622 represents the signed second public device-enclave key 615 being returned to and received by the secure enclave 110 for verification of its signature.

Process 624a represents the secure enclave 110 verifying the signature of the signed second public device-enclave key 615 using the first public device-enclave key 515. Upon successful verification, the secure enclave 110 may store the second public device-enclave key 615 in association with the user account, as represented by process 624b. Thus, the user may be provided with a second trusted user computing device 108b. For instance, according to the second example processes, rather than creating the user-enclave key pair bound to the user ID of the user, authentication is based on the validation of an already-trusted user computing device 108 of the user. In some examples, this validation can be performed by any enrolled user computing device 108 of the user. Thus, the user is enabled to access services provided by the secure enclave 110 (e.g., management and use passkeys) on multiple user computing devices 108 without having the secret key(s) being at risk locally in memory of each device.

Figure 7:
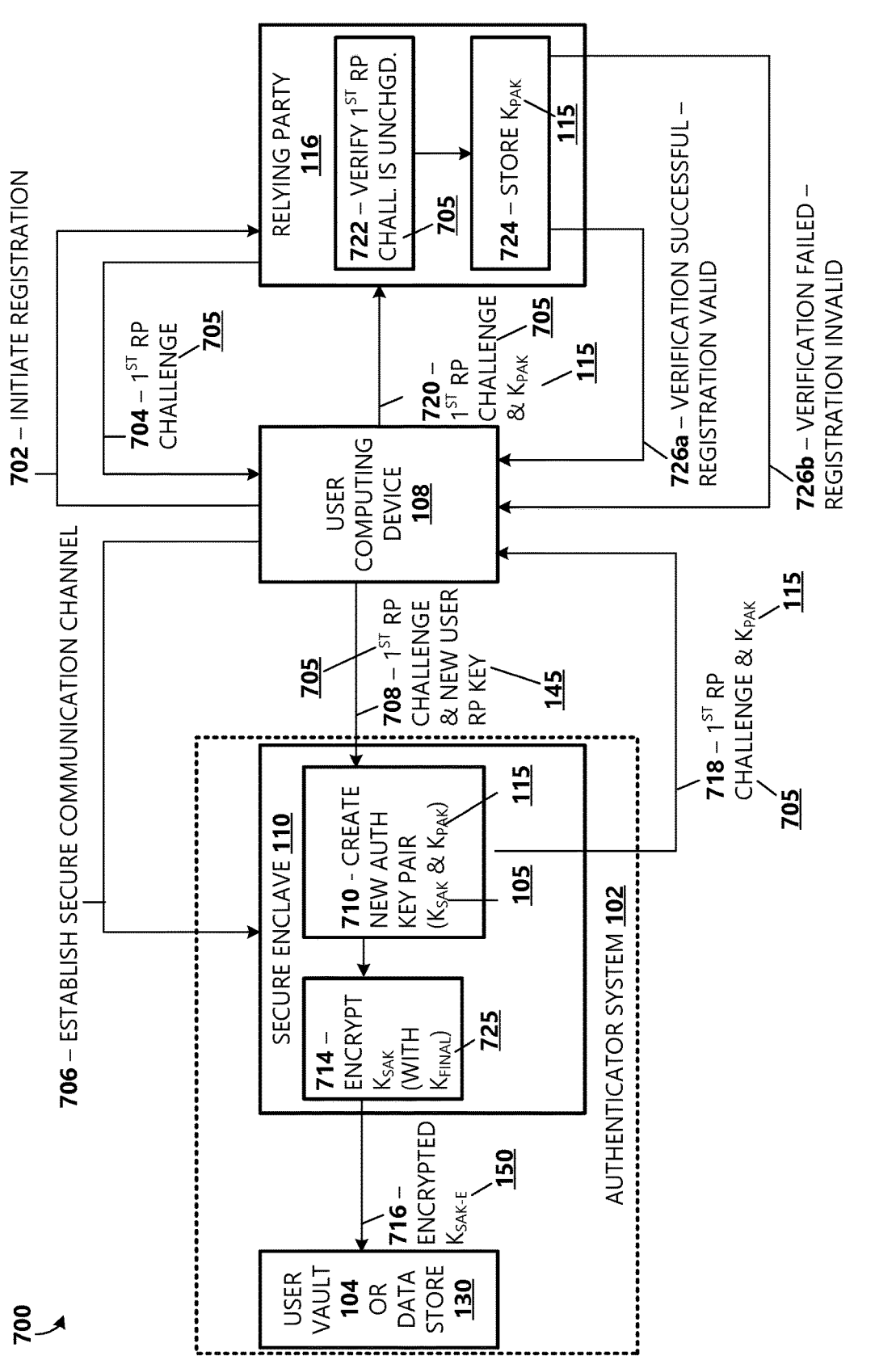
FIG. 7 illustrates a data flow for providing relying party registration with the authenticator system according to an example.

Having described example processes of registering a user computing device 108 as a trusted device with the secure enclave 110, FIG. 7 illustrates an example data flow 700 for providing relying party registration according to an example. A first data communication 702 represents the user computing device 108 initiating a registration process with a relying party 116 (e.g., via a web browser, desktop application, or mobile application) operating on the user computing device 108. The relying party 116 may use WebAuthn to authenticate its users and, thus, the user may need to authenticate themselves with the relying party 116 via an authentication credential.

As represented by a second data communication 704, the relying party 116 creates and sends a first RP challenge 705 (e.g., a WebAuthn assertion challenge) to the user computing device 108 to be signed by an authentication credential for the user.

As represented by a third data communication 706, the client application 106 operating on the user computing device 108 establishes a secure communication channel with the secure enclave 110. In examples, operations of methods described above with reference to FIG. 2 and at least one of FIGS. 3, 4, 5, 6A, and/or 6B may have previous been performed to enroll the user computing device 108 as a trusted device. For instance, the secure enclave 110 has a stored public device-enclave key (e.g., 335, 425, 515, and/or 615) corresponding to the trusted user computing device 108 and in association with the user.

Upon authentication of the user and the user computing device 108, the user computing device 108 may create a unique user key (e.g., a user RP key ($K_{USER-RPK}$) 145) associated with the RP 116 and with access policies that allow only the user to access the key upon successful user authentication. User authentication may include successful verification of a challenge signed with a secret device-enclave key (e.g., 325, 415, 505, and/or 605) corresponding to the trusted user computing device 108 and in association with the user. For instance, the secure enclave 110 verifies the signature using the corresponding stored public device-enclave key (e.g., 335, 425, 515, and/or 615). In some examples, user authentication further includes a local user verification check (e.g., using one or a combination of hardware- or software-based authentication mechanisms available on the user computing device 108). The user computing device 108 may then send the first RP challenge 705 and the user RP key ($K_{USER-RPK}$) 145 to the secure enclave 110, which is represented by a fourth data communication 708. According to an example implementation, the secure enclave 110 receives the authentication challenge (e.g., the first RP challenge 705) and the new user RP key ($K_{USER-RPK}$) 145. In examples, the new user RP key ($K_{USER-RPK}$) 145 triggers the secure enclave 110 to initiate registering the relying party 116 with the authenticator system 102. For instance, and as represented by operation 710, the secure enclave 110 generates authentication credentials (e.g., a secret authentication key ($K_{SAK}$) 105 and a public authentication key ($K_{PAK}$) 115) for the relying party 116. The authentication credentials may be used to authenticate the user to the relying party service or website and is unique to the user and the relying party 116. As represented by operation 714, the secure enclave 110 encrypts the secret authentication key ($K_{SAK}$) 105 for secure storage. In examples, the secure enclave 110 encrypts the secret authentication key ($K_{SAK}$) 105 with a key derived from a combination of keys. This key is referred to as a final key ($K_{FINAL}$) 725. In some implementations, the final key ($K_{FINAL}$) 175 is generated by using a key derivation function (KDF) that combines the user RP key ($K_{USER-RPK}$) 145 provided by the user computing device 108, a service key ($K_{SK}$) 155 (e.g., provided by the service provider 103 and made available within the secure enclave 110 during a bootstrapping process of the secure enclave 110), and an enclave local key ($K_{ELK}$) 135 provided by the KMS 114 (e.g., provided by the secure enclave provider). As represented by a fifth data communication 716, the secure enclave 110 stores the encrypted secret authentication key ($K_{SAK-E}$) 150. In some implementations, the encrypted secret authentication key ($K_{SAK-E}$) 150 is stored securely within the user vault 104. In other implementations, the encrypted secret authentication key ($K_{SAK-E}$) 150 is stored in a server-side data store 130. In presently described examples, the decrypted secret authentication key ($K_{SAK}$) 105 is never outside the boundary of the secure enclave 110.

As represented by a sixth data communication 718, the secure enclave 110 returns the first RP challenge 705 and the public authentication key ($K_{PAK}$) 115 to the user computing device 108. And as represented by a seventh data communication 720, the first RP challenge 705 and the public authentication key ($K_{PAK}$) 115 are provided to the relying party 116 by the user computing device 108. As represented by operation 722, the relying party 116 may verify the first RP challenge 705 is unchanged. Upon successful verification, registration is determined to be valid and the relying party 116 may store the public authentication key ($K_{PAK}$) 115 for verifying authentication challenges signed by using the corresponding secret authentication key ($K_{SAK}$) 105 during future assertion flows. The successful verification may be communicated to the user computing device 108, as represented by an eighth data communication 726a. Alternatively, a failed verification of the signed first RP challenge 705 may indicate an invalid registration. The failed verification may be communicated to the user computing device 108, as represented by a ninth data communication 726b.

Figure 8:
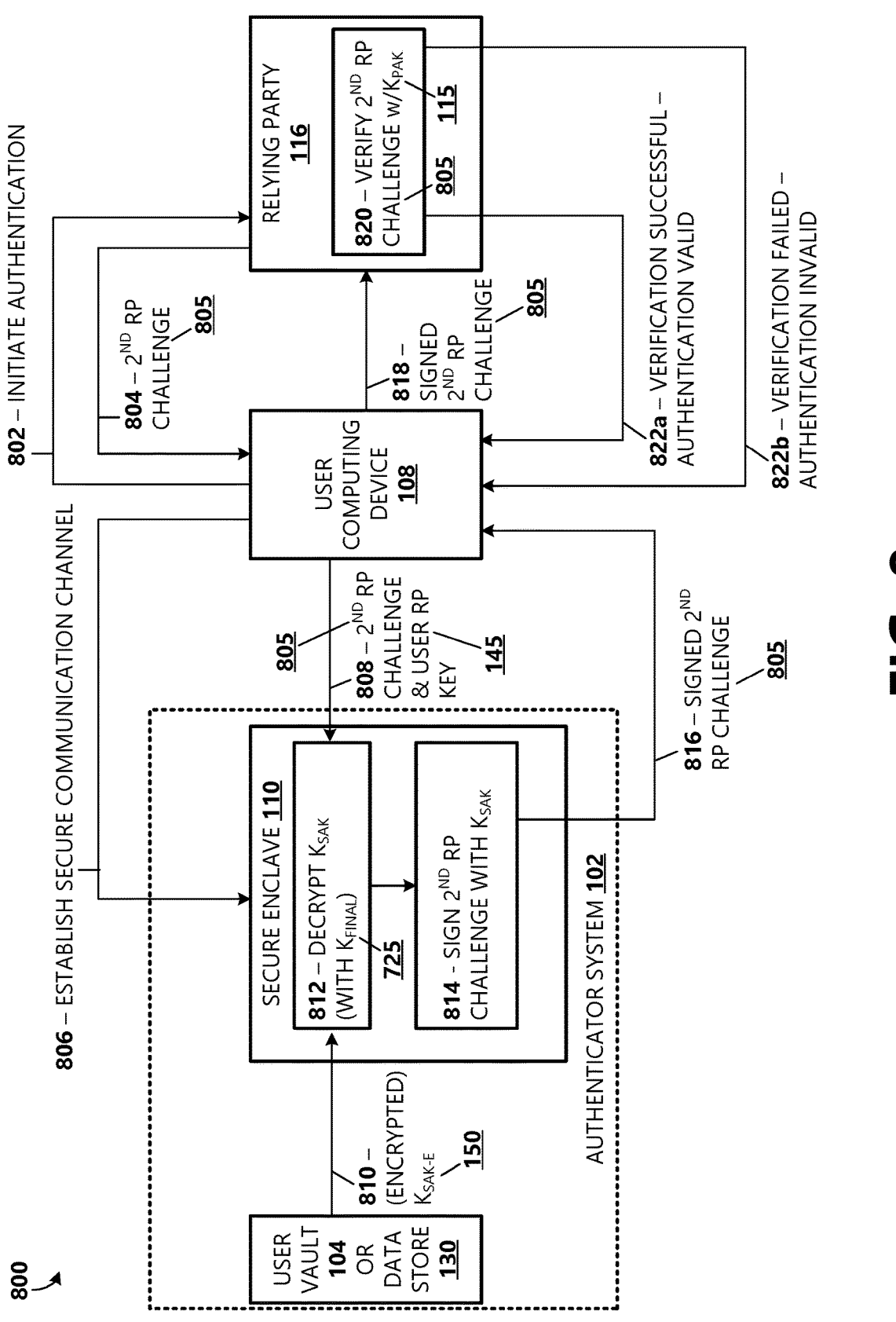
FIG. 8 illustrates a data flow for providing relying party assertion with the authenticator system according to an example.

With reference now to FIG. 8, an example data flow 800 for providing relying party assertion is illustrated according to an example. A first data communication 802 represents the user computing device 108 initiating an authentication process with the relying party 116 of FIG. 7. In response, the user computing device 108 receives an authentication challenge (e.g., a second RP challenge 805) from the relying party 116, as represented by a second data communication 804.

As represented by a third data communication 806, the client application 106 operating on the user computing device 108 establishes a secure communication channel with the secure enclave 110. In some examples, the user computing device 108 represented in the assertion data flow 800 in FIG. 8 is the same user computing device 108 used in the relying party registration data flow 700 illustrated in FIG. 7. In other examples, the user computing device 108 represented in the assertion data flow 800 is another trusted user device. For instance, operations of methods described above with reference to FIG. 2 and at least one of FIGS. 3, 4, 5, 6A, and/or 6B may have previous been performed to enroll the user computing device 108 as a trusted device. For instance, the secure enclave 110 has a stored public device-enclave key (e.g., 335, 425, 515, and/or 615) corresponding to the trusted user computing device 108 and in association with the user.

Upon authentication of the user and the user computing device 108, the user computing device 108 may access the user RP key ($K_{USER-RPK}$) 145 associated with the RP 116. User authentication may include successful verification of a challenge signed with a secret device-enclave key (e.g., 325, 415, 505, and/or 605) corresponding to the trusted user computing device 108 and in association with the user. The secure enclave 110 may verify the signature using the corresponding stored public device-enclave key (e.g., 335, 425, 515, and/or 615). In some examples, user authentication further includes a local user verification check on the user computing device 108). The user computing device 108 may then send the second RP challenge 805 and the user RP key ($K_{USER-RPK}$) 145 to the secure enclave 110, which is represented by a fourth data communication 808. In examples, the secure enclave 110 is requested to sign the second RP challenge 805 with the secret authentication key ($K_{SAK}$) 105 corresponding to the relying party 116.

To sign the authentication challenge with the secret authentication key ($K_{SAK}$) 105, the secure enclave 110 may obtain the encrypted secret authentication key ($K_{SAK-E}$) 150 from the user vault 104 or other data store 130, as represented by a fifth data communication 810. In examples, the secure enclave 110 uses a KDF to generate the final key ($K_{FINAL}$) 175 using the user RP key ($K_{USER-RPK}$) 145 provided by the user computing device 108, the service key ($K_{SK}$) 155, and the enclave local key ($K_{ELK}$) 135. As represented by operation 812, the secure enclave 110 may further use the final key ($K_{FINAL}$) 175 to decrypt the encrypted secret authentication key ($K_{SAK-E}$) 150. The decrypted secret authentication key ($K_{SAK}$) 105 is then used to sign the second RP challenge 805, which is represented by operation 814. A sixth data communication 816 represents the secure enclave 110 returning the signed second RP challenge 805 to the user computing device 108, and a seventh data communication 818 represents the user computing device 108 passing the signed second RP challenge 805 to the relying party 116. As represented by operation 820, the relying party 116 may verify the signed second RP challenge 805 by using the matching public authentication key ($K_{PAK}$) 115 provided in the registration flow 700. Upon a successful verification, authentication is determined to be valid and the relying party 116 may allow the user access to authorized services and/or resources provided by the relying party 116. The successful verification may be communicated to the user computing device 108, as represented by an eighth data communication 822a. Alternatively, a failed verification of the signed second RP challenge 805 may indicate an invalid authentication. The failed verification may be communicated to the user computing device 108, as represented by a ninth data communication 822b.

Figure 9:
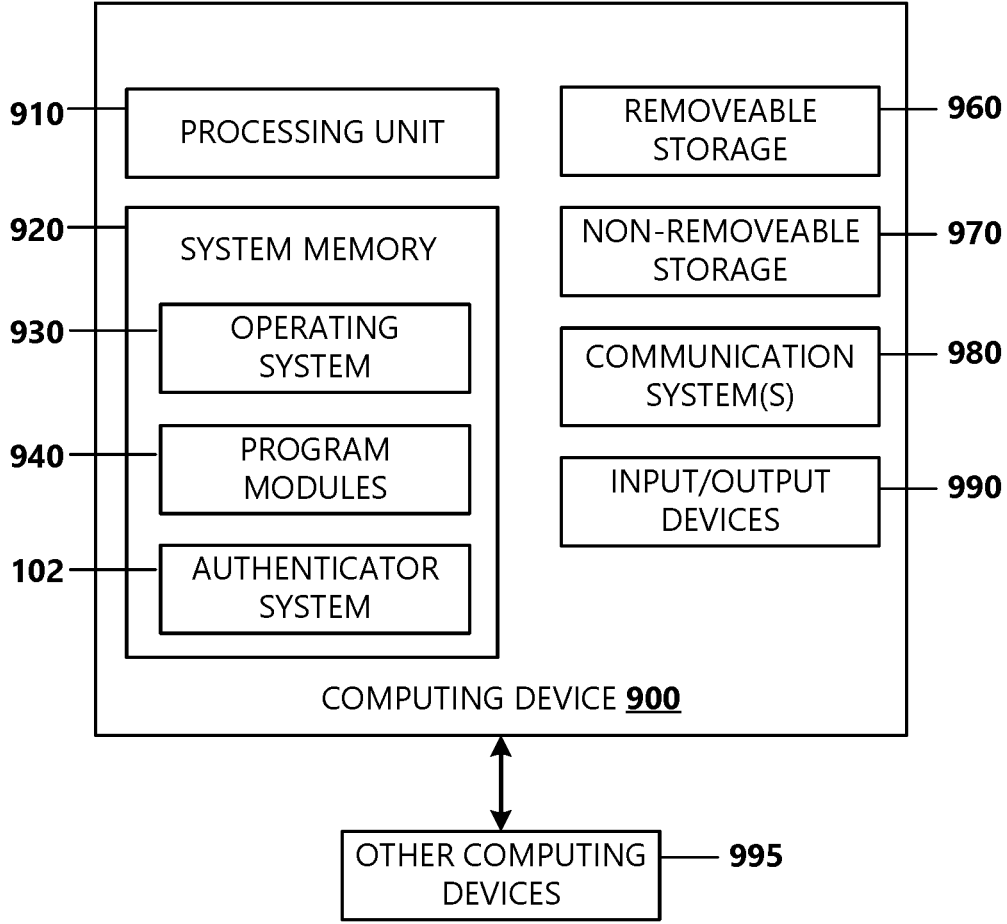
FIG. 9 is a block diagram of a computing device with which examples of the present disclosure may be practiced according to an example.

One or more aspects of the above-described systems and methods may be implemented on one or more computing systems. FIG. 9 is a block diagram illustrating physical components (i.e., hardware) of a computing device 900 with which examples of the present disclosure may be practiced. The computing device components described below may be suitable for one or more computing device(s) implementing or comprising one or more of the client device 108 (hosting the client application 106), the secure enclave server 120 hosting the secure enclave 110, the vault server 112 hosting the user vault 104, the KMS 114, and/or any other computing systems discussed herein. As shown in FIG. 9, the physical components (e.g., hardware) of the computing device 900 are illustrated and these physical components may be used to practice the various aspects of the present disclosure.

The computing device 900 may include at least one processing unit 910 and a system memory 920. The system memory 920 may include, but is not limited to, volatile storage (e.g., random access memory), non-volatile storage (e.g., read-only memory), flash memory, or any combination of such memories. The system memory 920 may also include an operating system 930 that controls the operation of the computing device 900 and one or more program modules 940. A number of different program modules and data files may be stored in the system memory 920. While executing on the processing unit 910, the program modules 940 may perform the various processes described above.

The computing device 900 may also have additional features or functionality. For example, the computing device 900 may include additional data storage devices (e.g., removable and/or non-removable storage devices) such as, for example, magnetic disks, optical disks, or tape. These additional storage devices are labeled as a removable storage 960 and non-removable storage 970.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 9 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 900 on the single integrated circuit (chip). The disclosure may also be practiced using other technologies capable of performing logical operations such as, for example, AND, OR, and NOT, including but not limited to mechanical, optical, fluidic, and quantum technologies.

The computing device 900 may include one or more communication systems 980 that enable the computing device 900 to communicate with other computing devices 995 such as, for example, routing engines, gateways, signing systems and the like. Examples of communication systems 980 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 900 may also have one or more input devices and/or one or more output devices shown as input/output devices 990. These input/output devices 990 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 920, the removable storage 960, and the non-removable storage 970 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 900. Any such computer storage media may be part of the computing device 900. Computer storage media is tangible and non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In some examples, the computing device 900 may include one or more secure enclave(s) 110. That is, one or more of the resources (e.g., processing unit(s) 910, system memory 920, and/or program modules 940, among other things) may be duplicated and/or allocated to one or more secure enclave(s) 110 within the computing device 900. In examples, a secure enclave 110 may also be referred to as a trusted execution environment. The secure enclave 110 may comprise a computing environment that provides isolation for code and data from the operating system 930 using either hardware-based isolation or isolating an entire virtual machine by placing the hypervisor within a trusted computing base. In examples, users with physical and/or root access to the computing device 900 and operating system 930 are prevented from accessing the contents of the secure enclave memory or tampering with the execution of code within the secure enclave 110. Nonexclusive, nonlimiting examples of secure enclaves 110 are available for consumer electronics devices, computers/servers, data centers, etc., including from vendors such as INTEL, AMD, and AMAZON WEB SERVICES. Other examples of secure enclaves 110 are possible and contemplated.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in the computing device 900. Any suitable combination of hardware, software, or firmware may be used to implement the system memory 920 and processing unit 910. For example, the system memory 920 and processing unit 910 may be implemented with computing device 900 or any other computing devices 995, in combination with computing device 900, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two operations shown in succession may in fact be executed substantially concurrently or the operations may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A cloud-based secure enclave of an authentication system of a service provider, comprising:

at least one processing unit; and memory storing instructions that, when executed by the at least one processing unit, cause the cloud-based secure enclave to perform operations comprising:

encrypting an authentication secret key using a user relying party (RP) key;

storing the encrypted authentication secret key;

receiving, from a user computing device, a first authentication challenge and the user RP key;

obtaining the encrypted authentication secret key;

decrypting the encrypted authentication secret key using the user RP key;

signing the first authentication challenge with the authentication secret key; and providing the signed first authentication challenge to the user computing device;

wherein the encrypting the authentication secret key and the decrypting the authentication secret key further comprise using a combination of the RP key, a service key from the service provider, and an enclave local key from a key management system of a provider of the secure enclave.

2. The cloud-based secure enclave of claim 1, wherein prior to encrypting the authentication secret key, the operations further comprise:

receiving, from the user computing device, a second authentication challenge and the user (RP) key;

generating an authentication key pair including the authentication secret key and an authentication public key; and providing the second authentication challenge and the authentication public key to the user computing device.

3. The cloud-based secure enclave of claim 2, wherein prior to receiving the second authentication challenge and the user RP key, the operations further comprise enrolling the user computing device as a trusted device of a user of the service provider using a device-enclave key associated with the user computing device and a user-enclave key associated with the user.

4. The cloud-based secure enclave of claim 2, wherein the user computing device is a first user computing device and the operations further comprise:

receiving, from a second user computing device, a third authentication challenge and the user RP key;

obtaining the encrypted authentication secret key;

decrypting the encrypted authentication secret key using the user RP key;

signing the third authentication challenge with the authentication secret key; and providing the signed third authentication challenge to the second user computing device.

5. The cloud-based secure enclave of claim 4, wherein prior to receiving the third authentication challenge and the user RP key from the second user computing device, the operations further comprise enrolling the second user computing device as a trusted device of a user of the service provider using a user-enclave key associated with the user and a device-enclave key associated with the second user computing device signed by a device-enclave key associated with the first user computing device.

6. The cloud-based secure enclave of claim 5, wherein the user RP key is stored in a user vault accessible to the first user computing device and the second user computing device and encrypted with a vault secret known by the user.

7. The cloud-based secure enclave of claim 1, wherein the operations further comprise receiving the service key from the service provider during bootstrapping of the secure enclave.

8. The cloud-based secure enclave of claim 1, wherein the operations further comprise generating an audit notification in response to a triggering event comprising at least one of:

a new device registration with the secure enclave;

authentication key generation;

authentication key signing;

an authentication failure; or a modification on a distribution list for the notification.

9. A method, comprising:

at a first time, establishing, by a cloud-based secure enclave of an authentication service of a service provider, a first secure communication channel with a first user computing device;

sending to the first user computing device a first authentication challenge;

receiving, from the first user computing device, the first authentication challenge signed by a first secret device key of a first device key pair;

verifying the first authentication challenge using a first public device key of the first device key pair;

upon successful verification of the first authentication challenge, authenticating the first user computing device as a trusted device of a user of the service provider;

storing the first public device key binding to an identifier of the first user computing device and an identifier of the user;

at a second time, establishing, by the cloud-based secure enclave, a second secure communication channel with a second user computing device;

sending the second user computing device a second authentication challenge;

receiving, from the second user computing device, the second authentication challenge signed by a second secret device key of a second device key pair;

verifying the second authentication challenge using a second public device key of the second device key pair and a stored key bound to the identifier of the user;

upon successful verification of the second authentication challenge, authenticating the second user computing device as another trusted device of the user; and storing the second public device key bound to an identifier of the second user computing device and the identifier of the user.

10. The method of claim 9, wherein:

the stored key bound to the identifier of the user is a public user-enclave key of a user key pair;

the first authentication challenge received from the first user computing device is additionally signed by the first user computing device using a secret user-enclave key of the user key pair; and the second authentication challenge received from the second user computing device is additionally signed by the second user computing device using the secret user-enclave key.

11. The method of claim 10, further comprising:

at the first time:

receiving the public user-enclave key of the user key pair;

verifying the first authentication challenge using the public user-enclave key in addition to the first public device key; and storing the public user-enclave key bound to the identifier of the user; and at the second time:

obtaining, from storage, the public user-enclave key; and verifying the second authentication challenge using the public user-enclave key in addition to the second public device key.

12. The method of claim 9, wherein:

the stored key bound to the identifier of the user is the first public device key; and verifying the second authentication challenge comprises:

after verifying the second authentication challenge using the second public device key and upon verification of the second authentication challenge, sending, to the first user computing device, the second public device key and a request to sign the second public device key with the first secret device key;

receiving, from the first user computing device, the second public device key signed by the first secret device key;

obtaining, from storage, the first public device key; and verifying the second public device key using the first public device key.

13. The method of claim 9 further comprising, after authenticating the first user computing device:

receiving, from the first user computing device, a user relying party (RP) key associated with an RP and a first RP challenge from the RP;

generating an authentication key pair including a secret authentication key and a public authentication key;

encrypting the secret authentication key using a combination of keys including the user RP key;

storing the encrypted secret authentication key; and providing, to the first user computing device, the first RP challenge and the public authentication key.

14. The method of claim 13, further comprising, after authenticating the second user computing device:

receiving, from the second user computing device, the user RP key and a second RP challenge from the RP;

obtaining, from storage, the encrypted secret authentication key;

decrypting the secret authentication key using a combination of keys including the user RP key;

signing the second RP challenge with the authentication secret key; and providing, to the second user computing device, the signed second RP challenge.

15. The method of claim 14, further comprising:

receiving, during deployment of the secure enclave and from a key management system of a provider of the secure enclave, an enclave local key; and using the enclave local key in the combination of keys.

16. The method of claim 14, further comprising:

receiving, during deployment of the secure enclave and from the service provider, a service key; and using the service key in the combination of keys.

17. A system, comprising:

at least one processing unit; and memory storing instructions that, when executed by the at least one processing unit, cause the system to:

receive, by a cloud-based secure enclave of an authentication service of a service provider and from a first user computing device, a first authentication challenge and a user relying party (RP) key;

generate an authentication key pair including an authentication secret key and an authentication public key;

encrypt the authentication secret key using a key combination including the user RP key;

cause the encrypted authentication secret key to be stored in a data store;

provide the first authentication challenge and the authentication public key to the first user computing device;

receive, from a second user computing device, a second authentication challenge and the user RP key;

obtain the encrypted authentication secret key from the data store;

decrypt the encrypted authentication secret key using the key combination including the user RP key;

sign the second authentication challenge with the authentication secret key; and provide the signed second authentication challenge to the second user computing device.

18. The system of claim 17, wherein prior to receiving the user RP key, the instructions cause the system to enroll the first user computing device and the second user computing device with the authentication service using an enrollment process comprising one of:

enrolling the first user computing device using a first device-enclave key linked to the first user computing device and a user-enclave key linked to a user; and enrolling the second user computing device using a second device-enclave key linked to the second user computing device and the user-enclave key, wherein the user is an authenticated user on the first user computing device and the second user computing device; or enrolling the first user computing device using the first device-enclave key; and enrolling the second user computing device using the second device-enclave key signed by the first user computing device using the first device-enclave key.

* * * * *